United States Patent
Sakayori et al.

(10) Patent No.: US 7,703,503 B2
(45) Date of Patent: Apr. 27, 2010

(54) HEAT PIPE HEAT EXCHANGER AND METHOD OF FABRICATING THE SAME

(75) Inventors: Hitoshi Sakayori, Tsukuba (JP); Tooru Kurosawa, Tsuchiura (JP); Hironori Kitajima, Tsuchiura (JP); Katsumi Nomura, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 145 days.

(21) Appl. No.: 11/392,658

(22) Filed: Mar. 30, 2006

(65) Prior Publication Data
US 2006/0243428 A1      Nov. 2, 2006

(30) Foreign Application Priority Data
Apr. 28, 2005   (JP) .............................. 2005-132841

(51) Int. Cl.
*F28D 15/02* (2006.01)
(52) U.S. Cl. .............................. 165/104.33; 29/890.032
(58) Field of Classification Search ................ 165/80.2, 165/80.3, 104.21, 104.26, 104.33; 361/700; 29/890.032, 890.044
See application file for complete search history.

(56) References Cited

U.S. PATENT DOCUMENTS

| | | | | |
|---|---|---|---|---|
| 3,461,952 A | * | 8/1969 | Decker et al. ................ | 165/45 |
| 3,792,318 A | * | 2/1974 | Fries et al. ............. | 165/104.26 |
| 4,557,413 A | * | 12/1985 | Lewis et al. ................ | 228/183 |
| 4,880,052 A | * | 11/1989 | Meyer et al. ........... | 165/104.26 |
| 4,982,274 A | * | 1/1991 | Murase et al. .......... | 165/104.33 |
| 5,229,915 A | * | 7/1993 | Ishibashi et al. ........ | 165/104.33 |
| 5,309,717 A | * | 5/1994 | Minch .......................... | 60/527 |
| 5,651,414 A | * | 7/1997 | Suzuki et al. ........... | 165/104.14 |
| 6,133,631 A | * | 10/2000 | Belady ...................... | 257/714 |
| 6,189,213 B1 | * | 2/2001 | Kimura et al. ............. | 165/80.3 |
| 6,216,771 B1 | * | 4/2001 | Holmberg et al. ............. | 165/46 |
| 6,230,788 B1 | * | 5/2001 | Choo et al. .................... | 165/46 |

(Continued)

FOREIGN PATENT DOCUMENTS

GB      2 278 676 A      7/1994

(Continued)

OTHER PUBLICATIONS

Chinese Office Action dated Jan. 4, 2008 with partial English Translation.

(Continued)

*Primary Examiner*—Teresa J Walberg
(74) *Attorney, Agent, or Firm*—McGinn Intellectual Property Law Group, PLLC

(57) ABSTRACT

A heat pipe heat exchanger and a method for fabricating the same are disclosed. A heat pipe heat exchanger 1 is provided with a heat pipe 2, and a heat block 3 having a heat pipe-holding hole 3A, and a fin 4 having a fin base portion 4A, to which the heat pipe 2 is joined by a heating tube expansion method. The heat pipe 2 is plastically deformable and in which a predetermined amount of hydraulic fluid 2*a* is sealed. The heat pipe 2 is composed of a pipe having a cross section except a perfect circle. The heat pipe-holding hole 3A and the fin base portion 4A are composed of holes each having a cross section except the perfect circle.

21 Claims, 7 Drawing Sheets

U.S. PATENT DOCUMENTS

2002/0159237 A1 * 10/2002 Patel et al. .................. 361/719
2005/0201059 A1 * 9/2005 Lin et al. .................... 361/700

FOREIGN PATENT DOCUMENTS

| JP | 2541056 | | 4/1993 |
| JP | 6-53679 | * | 2/1994 |
| JP | 6-181397 | * | 6/1994 |
| JP | 7-198280 | * | 8/1995 |
| JP | 2002-327992 | | 11/2002 |

OTHER PUBLICATIONS

Japanese Office Action dated Oct. 20, 2009, with English translation.

* cited by examiner (B-B CROSS SECTION)

(C-C CROSS SECTION)

24 FIN
24A FIN BASE PORTION
22' HEAT PIPE (BEFORE PLASTIC DEFORMATION)

21 HEAT PIPE HEAT EXCHANGER
22 HEAT PIPE (AFTER PLASTIC DEFORMATION)
24 FIN
5' RESIDUAL SPACE
24A FIN BASE PORTION

HEAT PIPE HEAT EXCHANGER AND METHOD OF FABRICATING THE SAME

The present application is based on Japanese Patent Application No. 2005-132841 filed on Apr. 28, 2005, the entire contents of which are incorporated herein by reference.

BACKGROUND OF THE INVENTION

1. Field of the Invention

This invention relates to a heat pipe heat exchanger and a method for fabricating the same, in more particularly to a heat pipe heat exchanger in which a heat conductive member is disposed around a heat pipe and a method for fabricating the same.

2. Description of the Related Art

As an example of conventional heat pipe heat exchangers, a heat exchanger comprising a heat pipe composed of a tubular closed container having a perfect circle cross section and enclosing a hydraulic fluid, and a heat conductive member (e.g. fins and/or a heat block) attached to the heat pipe for facilitating heat exchange with the heat pipe has been known.

Such a heat pipe heat exchanger is broadly used in various fields as a thermal diffuser, since the heat pipe heat exchanger has advantages in that the heat pipe itself has a relatively simple structure and that a large heat transfer can be achieved in a small temperature difference.

Conventionally, in such a heat pipe heat exchanger, various methods such as press-fit method, mechanical tube expansion method, charging (filling) method, heating tube expansion method are adopted as a method for attaching the heat conductive member around the heat pipe. In particular, the heating tube expansion method is a method superior to the other methods, since a manufacturing workability can be improved and manufacturing facilities can be miniaturized. For example, the Japanese Patent No. 2541056 discloses a heat pipe heat exchanger using the heating tube expansion method.

Next, the heating tube expansion method is explained in more detail. According to the heating tube expansion method, a pipe-holding hole having a diameter slightly larger than that of the heat pipe is formed at a heat conductive member (e.g. a heat block and/or fins), then the heat pipe (closed container) is installed in the pipe-holding hole. Thereafter, by heating the heat pipe, the heat pipe is plastically deformed by a vapor pressure (internal pressure) of a hydraulic fluid enclosed in the container such that the heat pipe and the heat conductive member are contacted closely with each other and joined with each other. Through the description of the present invention, the "pipe-holding hole" means a hole (aperture) to make contact closely and adhere the heat pipe to the heat conductive member (such as the heat block or the fins).

When the heat pipe is installed in the heat conductive member by using the heating tube expansion method, smaller a gap (space) between an outer periphery surface of the heat pipe and an inner periphery surface of the pipe-holding hole is, smaller an amount of plastic deformation of the heat pipe required for the adhesion is, so that a heating temperature can be lowered. However, considering a required processing precision (processing tolerance) and a manufacturing (assembling) workability of an outer diameter of the heat pipe and an inner diameter of the pipe-holding hole, a tolerance in designed dimensions in a radial direction is generally set around 0.5 mm (a difference in diameters).

On the other hand, in the heating tube expansion method, the heating temperature of the heat pipe should be necessarily set at a temperature that does not go beyond a bursting temperature of the heat pipe.

For example, FIG. 1 is a graph showing a relationship between a heating temperature T and a pressure P as well as a relation between the heating temperature T and an increment $\Delta D$ of an outer diameter of the heat pipe, wherein a heat pipe made of copper having an outer diameter d of 9.52 mm, a wall thickness t of 0.34 mm, and an effective length of the heat pipe is 1000 mm and aqua is used as hydraulic fluid. As clearly understood from FIG. 1, a bursting temperature of the heat pipe corresponds to an intersection (about 304° C.) of a curve P1 indicating a saturation vapor pressure of the hydraulic fluid (aqua) in the heat pipe (copper tube) to the heating temperature T and a curve P2 indicating bursting pressure (destruct pressure) of the heat pipe to the heating temperature T.

From the above, when the gap between the outer periphery surface of the heat pipe and the inner periphery surface of the pipe-holding hole is set as 0.5 mm in the case as shown in FIG. 1, the heating temperature T of the heat pipe should be around 300° C. (T≈299° C.), which is slightly lower than a critical temperature (burst temperature), and it is necessary to keep this heating temperature T for a predetermined time. At this time, the internal pressure of the heat pipe becomes about 8.5 MPa (about 85 kgf/cm$^2$).

Now, the heat pipe as described above is fabricated as follows. A pipe for forming a heat pipe is a tube having a perfect circle cross section, and previously provided with a groove (trench) or wick (capillary tube configuration which facilitates a flow back of the hydraulic fluid) at the inner periphery surface thereof. A work of reducing diameter of the tube, etc. is conducted for openings at both ends of the pipe. Thereafter, a reduced opening at one end of the pipe is closed by welding to provide a heat pipe container then a predetermined amount of hydraulic fluid is injected into the heat pipe container. Finally, this inlet (a reduced opening at another end of the pipe) is closed (sealed) by caulking or welding. In the heat pipe fabricated as described above, when the internal pressure is increased by heating, a straight part of the heat pipe having a perfect circle cross section has the highest mechanical strength as against the internal pressure. On the other hand, the both ends of the heat pipe have non-circular cross sections (non-spherical curved surface) since they are provided with the caulking or welding point, so that they have the lowest mechanical strength in the total configuration.

Further, in the heating tube expansion method, when heating the heat pipe installed in the pipe-holding hole of the heat conductive member, the plastic deformation occurs in the heat pipe due to the pipe internal pressure (the vapor pressure of the hydraulic fluid). At this time, the straight part of the heat pipe is protected by being adhered to the inner periphery surface of the pipe-holding hole, since the plastic deformation towards this direction does not progress due to the adhesion. On the other hand, since the ends of the heat pipe are exposed in the air and the mechanical strength thereof is low in the total configuration, there is an apprehension that the ends of the heat pipe may be broken (burst) due to the progress of the plastic deformation.

As described above, in the fabrication of the heat pipe heat exchanger by using the heating tube expansion method, the heat pipe is plastically deformed to be adhered to the heat conductive member around a theoretical destruct point. Therefore, it is very important to determine the gap between the outer periphery surface of the heat pipe and the inner periphery surface of the pipe-holding hole, and to set the heating temperature for the heat pipe. Further, considering a fluctuation in a real heating temperature, etc., the actual work required to be conducted under severe conditions (with small tolerance of margin).

Accordingly, a method for fabricating a heat pipe heat exchanger that can relax the working conditions has been desired.

As described above, according to the conventional method for fabricating a heat pipe heat exchanger, the heat pipe having the perfect circle cross section, which is disposed in the pipe-holding hole having the perfect circle shaped opening, is heated, so that the heat pipe is plastically deformed by the expansion force caused by the vapor pressure of hydraulic fluid in the container, so as to attach the heat conductive member to the heat pipe. Accordingly, it is necessary to heat the heat pipe by controlling the heating temperature to be lower than the critical temperature (bursting temperature) while keeping a plastic deformation amount of the heat pipe. Therefore, there is a disadvantage in that a burden for controlling the temperature on the manufacturer becomes heavy.

In addition, when the heat pipe is heated at a temperature around the critical temperature, a thermal load and a pressure load on the heat pipe are increased. As a result, there are disadvantages in that a rate of defective products becomes high and that productivity (yield) is deteriorated.

SUMMARY OF THE INVENTION

Accordingly, it is an object of the invention to provide a heat pipe heat exchanger and a method for fabricating the same, by which the burden for the thermal management can be reduced and the productivity can be improved.

According to the first feature of the invention, a heat pipe heat exchanger, comprises:

a heat pipe containing a predetermined amount of hydraulic fluid; and a heat conductive member having a heat pipe-holding hole, the heat pipe-holding hole being of a cross section other than a perfect circle;

wherein:

the heat pipe is plastically deformed to be held in the heat pipe-holding hole, such that an outer periphery surface of the heat pipe is in contact with an inner periphery surface of the heat pipe-holding hole.

According to the second feature of the invention, the heat pipe heat exchanger further comprises:

a heat conductive material interposed between the inner periphery surface of the pipe-holding hole and the outer periphery surface of the heat pipe.

According to the third feature of the invention, in the heat pipe heat exchanger, the heat pipe comprises a pipe having a polygonal cross section and the cross section of the heat pipe-holding hole is polygonal.

According to the fourth feature of the invention, in the heat pipe heat exchanger, the cross section of the heat pipe and the cross section of the heat pipe-holding hole are analogous to each other.

According to the fifth feature of the invention, in the heat pipe heat exchanger, the heat pipe is of a cross section of a regular square; and
the heat pipe-holding hole is of a cross section of a regular square;

whereby the heat pipe and the heat pipe-holding hole are in contact with each other along four sides.

According to the sixth feature of the invention, in the heat pipe heat exchanger, the heat pipe and the heat pipe-holding hole are in contact with each other to provide four spaces at four corners of the regular square cross section.

According to the seventh feature of the invention, in the heat pipe heat exchanger, the heat pipe is of a rectangular cross section; and
the heat pipe-holding hole is of a rectangular cross section;

whereby the heat pipe and the heat pipe-holding hole are in contact with each other along two sides.

According to the eighth feature of the invention, in the heat pipe heat exchanger, the heat pipe and the heat pipe-holding hole are in contact with each other to provide two spaces at both sides of the rectangular cross section.

According to the ninth feature of the invention, a method for fabricating a heat pipe heat exchanger, comprises steps of:

providing a heat pipe containing a predetermined amount of hydraulic fluid;

providing a heat conductive member having a heat pipe-holding hole with a cross section other than a perfect circle; and plastically deforming the heat pipe to be held in the heat pipe-holding hole, such that an outer periphery of surface of the heat pipe is in contact with an inner periphery surface of the heat pipe-holding hole.

According to the tenth feature of the invention, in the method for fabricating a heat pipe heat exchanger, the heat pipe is deformed by heating tube expansion method.

BRIEF DESCRIPTION OF THE DRAWINGS

Preferred embodiments according to the invention will be described in conjunction with appended drawings, wherein:

FIGS. 2A to 2C are schematic illustrations showing a heat pipe heat exchanger in the first preferred embodiment according to the invention, wherein FIG. 2A is a vertical cross sectional view thereof, FIG. 2B is a cross sectional view thereof cut along B-B line, and FIG. 2C is a cross sectional view thereof cut along C-C line;

FIGS. 3A and 3B are cross sectional views showing a method for fabricating a heat pipe heat exchanger in the first preferred embodiment according to the invention, wherein FIG. 3A is a cross sectional view showing a heat pipe before plastic deformation and FIG. 3B is a cross sectional view showing a heat pipe after plastic deformation;

FIGS. 5A and 5B are cross sectional views of a heat pipe heat exchanger showing a method for fabricating a heat pipe heat exchanger in the second preferred embodiment according to the invention, wherein FIG. 5A is a cross sectional view showing a heat pipe before plastic deformation installed in a heat block and FIG. 5B is a cross sectional view showing a heat pipe after plastic deformation; and FIGS. 6A and 6B are cross sectional views of the heat pipe heat exchanger showing a method for fabricating a heat pipe heat exchanger in the second preferred embodiment according to the invention, wherein FIG. 6A is a cross sectional view showing a heat pipe before plastic deformation installed in a fin base portion and FIG. 6B is a cross sectional view showing a heat pipe after plastic deformation.

DETAILED DESCRIPTION OF PREFERRED EMBODIMENTS

Next, a heat pipe heat exchanger in preferred embodiments according to the present invention will be explained in more detailed in conjunction with the appended drawings.

First Preferred Embodiment

Figure 1:
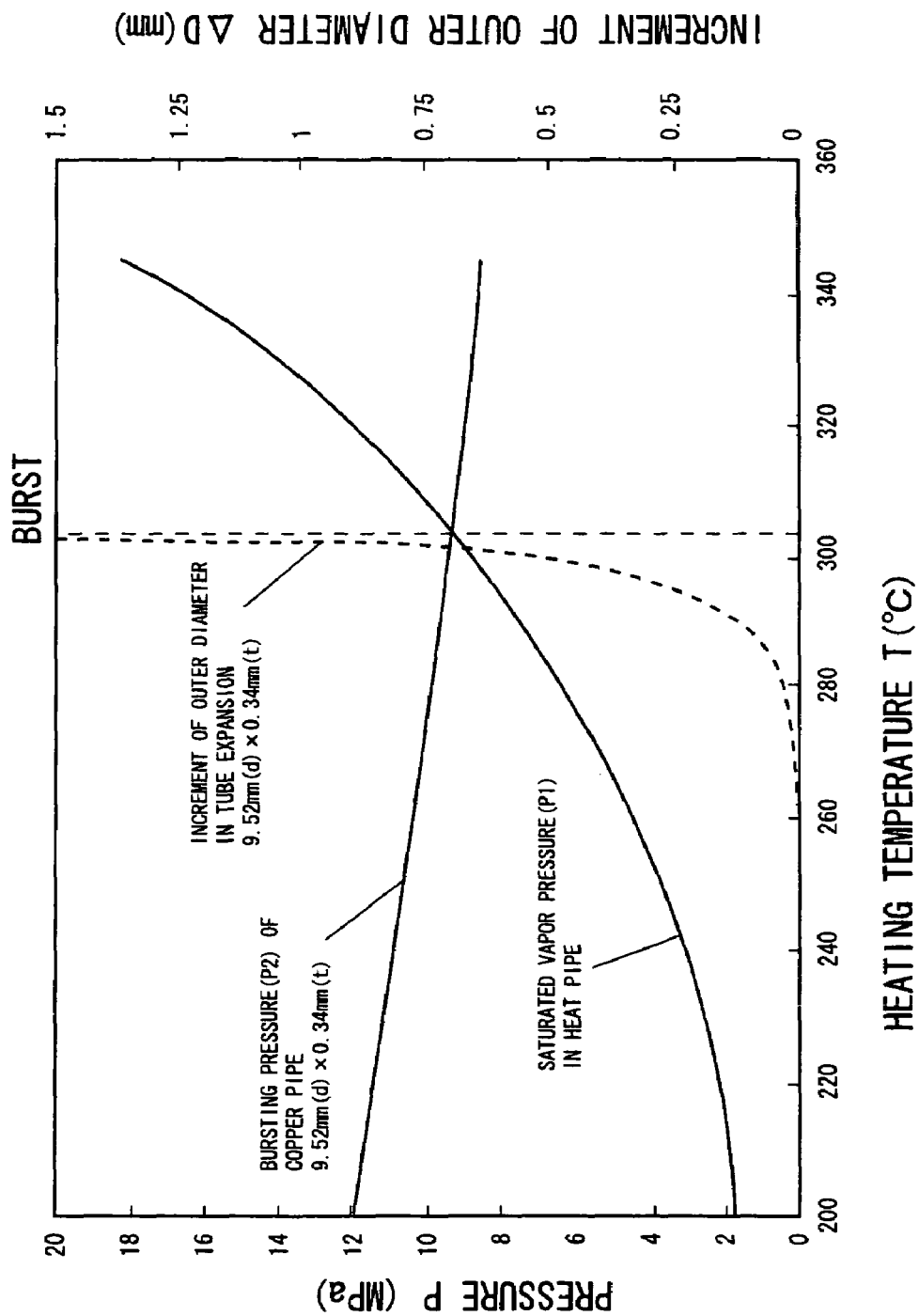
FIG. 1 is a graph for explaining a heating temperature for conducting a conventional method for fabricating a heat pipe heat exchanger, which shows a relationship between a heating temperature T and a pressure P as well as a relationship between the heating temperature T and an increment $\Delta D$ of an outer diameter of the heat pipe.
Figure 2A:
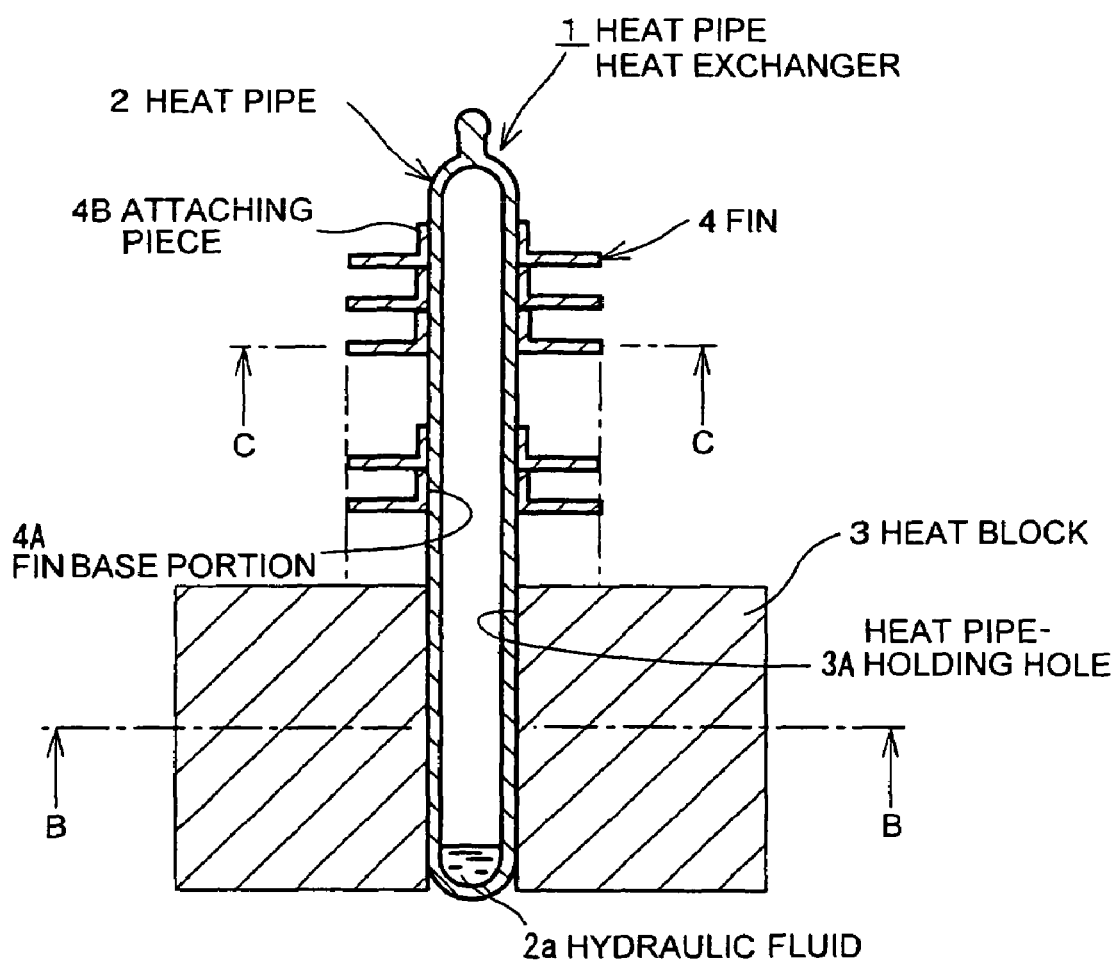
Figure 2B:
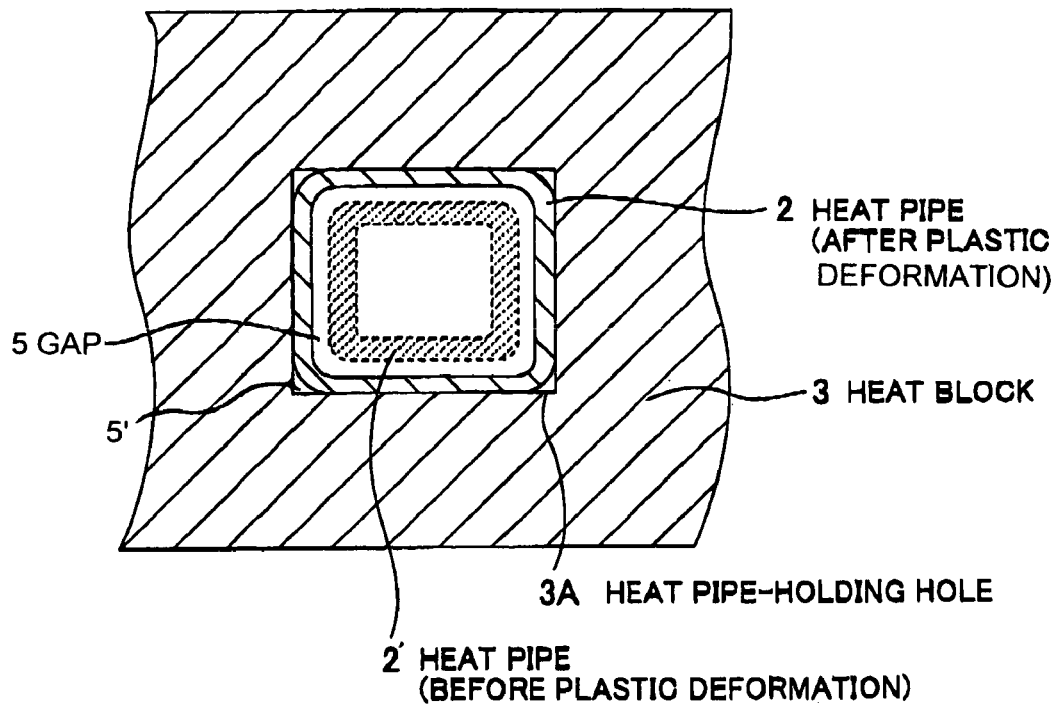
Figure 2C:
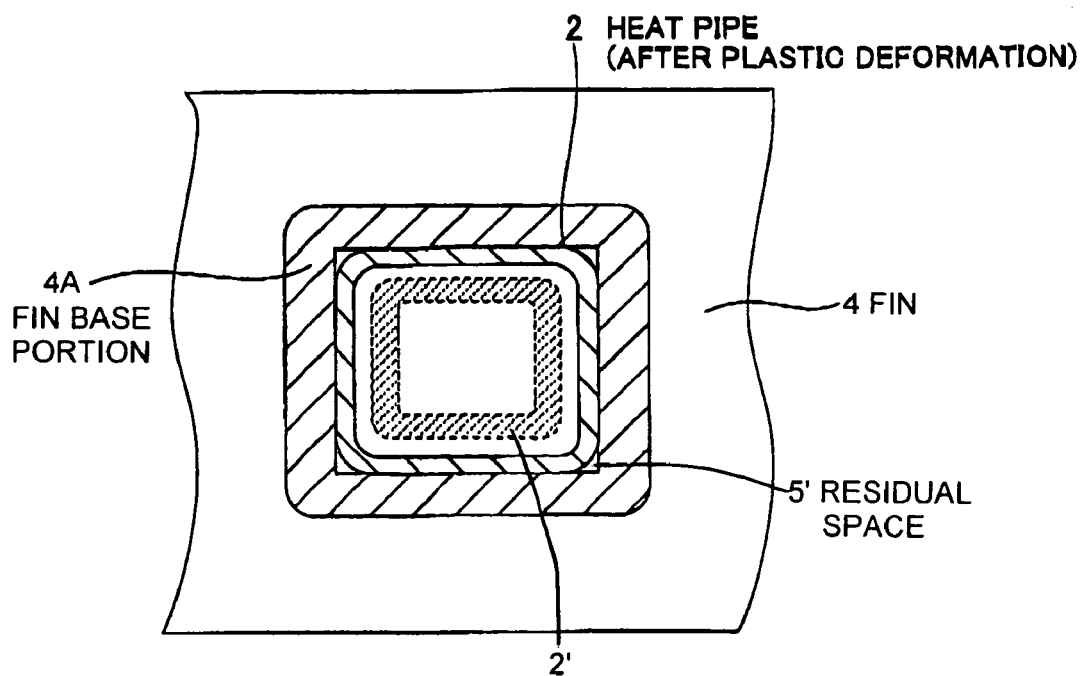

FIGS. 2A to 2C are schematic illustrations showing a heat pipe heat exchanger in the first preferred embodiment according to the invention, wherein FIG. 2A is a vertical cross sectional view thereof, FIG. 2B is a cross sectional view thereof cut along B-B line, and FIG. 2C is a cross sectional view thereof cut along C-C line.

(Whole Configuration of a Heat Exchanger)

As shown in FIGS. 2A to 2C, a heat pipe heat exchanger 1 comprises a heat block (heat conductive member) 3 which receives a heat transferred from a heat exchange object (not shown), a heat pipe 2 contacting the heat block 3, and a plurality of fins (heat conductive members) 4 which radiate a heat transferred from the heat pipe 2 into the air. In accordance with applications (manner of use) of the heat pipe heat exchanger, only either the heat block 3 or the fins 4 may be attached to the heat pipe 2 (not shown). Herein, the fins 4 are provided as cooling fins.

(Configuration of the Heat Pipe 2)

The heat pipe 2 is composed of a closed container in which a predetermined amount of hydraulic fluid 2a is sealed, and the heat pipe 2 is entirely composed of plastically deformable metal. In the first preferred embodiment, as shown in FIGS. 2B and 2C, the heat pipe 2 is a pipe having a cross section of a regular square. As a material of the heat pipe 2, metal such as copper or copper alloy, aluminum or aluminum alloy, titanium or titanium alloy, stainless steel may be preferably used. As a material of the hydraulic fluid 2a, a fluid such as aqua, chlorofluorocarbon, ammonia water may be used.

As shown in FIGS. 2B and 2C, the heat pipe 2 after plastic deformation is indicated by a continuous line, and the heat pipe 2' before plastic deformation is indicated by a broken line.

(Configuration of the Heat Block 3)

As shown in FIG. 2A, the heat block 3 comprises a metal block provided with one or more heat pipe-holding holes 3A, which are positioned in parallel with each other in a horizontal direction (widthwise direction) and opened to a vertical direction (height direction), and the heat block 3 is joined with the heat pipe 2 by the heating tube expansion method. The number of the heat pipe-holding holes 3A is one in FIGS. 2A and 2B. As a material of the heat block 3, metal with high conductance of heat, such as copper, copper alloy, aluminum or aluminum alloy may be preferably used. In the first preferred embodiment, the heat pipe-holding hole 3A is composed of a hole having a cross section of a regular square as shown in FIG. 2B. A gap 5 between the heat pipe 2' (before plastic deformation) and the heat pipe-holding hole 3A is reduced and a residual space 5' is provided at each corner of the heat pipe-holding hole 3A. Although it is not specially illustrated, the shape (profile) of the opening may be a polygon with chamfered corners (cut-off corners) or a configuration with a curvature (so-called "R"). Although a method for forming the heat pipe-holding hole 3A is not limited, a method such as an extruding processing of a block having the heat pipe-holding hole 3A, an assembling of divided blocks (a method for forming the pipe-holding hole by assembling plural blocks provided with concave grooves) may be preferably used.

(Configuration of the Fin 4)

As shown in FIG. 2A, the fins 4 are respectively disposed in parallel with a longitudinal direction of the heat pipe 2. Each of the fins 4 comprises a plate-like member attached around the heat pipe 2 by the heating tube expansion method. In addition, as a material of the fin 4, metal such as copper or copper alloy, aluminum or aluminum alloy may be preferably used. The fin 4 is provided with a fin base portion 4A in which the heat pipe 2 is positioned. In the first preferred embodiment, the fin base portion 4A is provided with a hole having a cross section of a regular square as shown in FIG. 2C. A gap 5 between the heat pipe 2' (before plastic deformation) and the fin base portion 4A is reduced and a residual space 5' is provided at each corner of the hole of the fin base portion 4A. Although it is not specially illustrated, the shape (profile) of the opening may be a polygon with chamfered corners (cut-off corners) or a configuration with a curvature (so-called "R"). Herein, when a plate thickness of the fin 4 is thin and there is an apprehension that the fin 4 may be deformed due to a stress caused by the heating tube expansion, it is preferable to provide a ring-shaped attaching piece 4B integrally with the fin base portion 4A at an aperture periphery of the fin base portion 4A, so as to install the fin 4 to the heat pipe 2. Of course, the ring-shaped attaching piece 4B may be unnecessary, when a mechanical strength of the fin 4 is sufficient.

In the first preferred embodiment, each of the fins 4 is composed of a single plate member, the plate member for forming the fin 4 to hold the heat pipe 2 may be divided into two fin elements (a first heat conductive member and a second heat conductive member), or three or more fin elements.

(Method for Fabricating a Heat Pipe Heat Exchanger)

Next, a method for fabricating a heat pipe heat exchanger in the first preferred embodiment according to the present invention will be explained referring to FIGS. 2A to 2C, 3A and 3B.

Figure 3A:
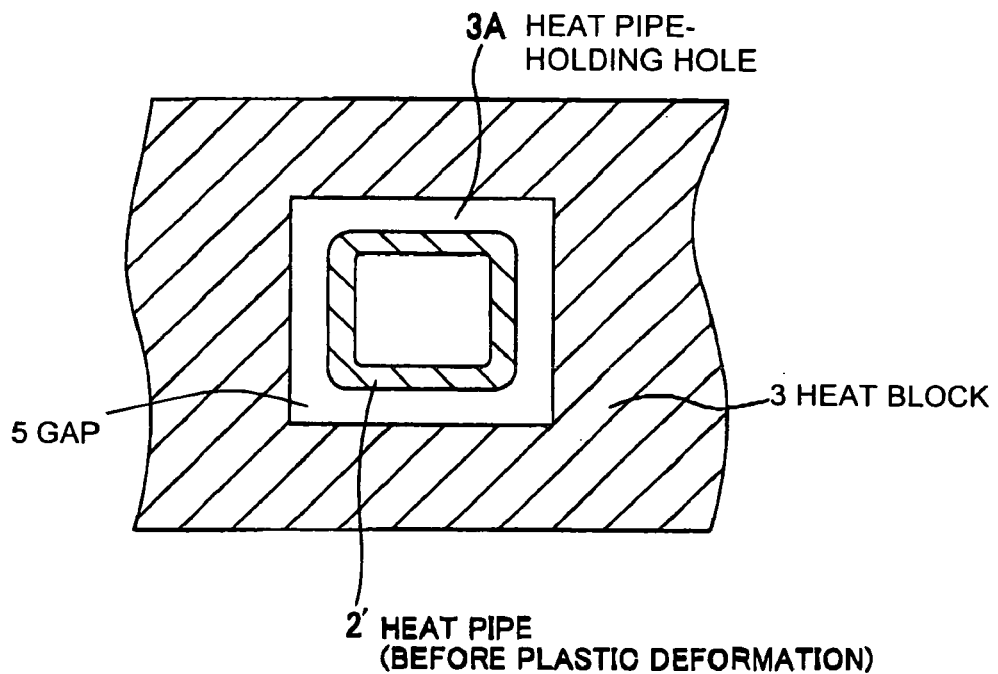
Figure 3B:
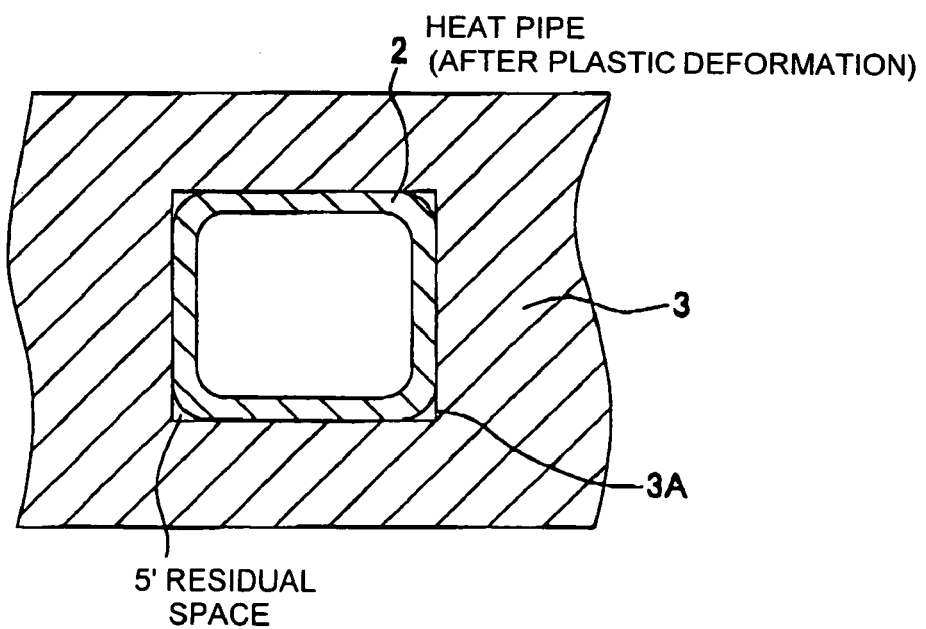

FIGS. 3A and 3B are cross sectional views showing a method for fabricating a heat pipe heat exchanger in the first preferred embodiment according to the invention, wherein FIG. 3A is a cross sectional view showing an installation state of the heat pipe before plastic deformation, and FIG. 3B is a cross sectional view showing the heat pipe after plastic deformation (after heating tube expansion) which is joined with the pipe-holding hole of the heat conductive member. Namely, FIGS. 3A and 3B are schematic illustrations showing the state of the heat pipe 2 shown in FIG. 2B.

According to the method of fabricating a heat pipe heat exchanger in the first preferred embodiment, steps of "forming the heat pipe", "installing the heat pipe" and "heating the heat pipe" are sequentially conducted. The respective steps will be explained as follows.

Since the aforementioned heat pipe heat exchanger 1 can be obtained by the method for fabricating a heat pipe heat exchanger in the first preferred embodiment, the respective steps are explained in conjunction with FIGS. 2A, 3A and 3B, and same reference numerals in FIG. 2A are used for indicating similar parts in FIGS. 3A and 3B.

Step of "Forming the Heat Pipe"

Firstly, a heat pipe 2' (before plastic deformation) is composed of a closed container having a cross section except a perfect circle, in which a predetermined amount of hydraulic fluid 2a is sealed as shown in FIG. 2A. In the first preferred embodiment, a profile of the heat pipe 2' in its cross section is square-shape as shown in FIG. 3A. At this time, a forming process may be conducted for the heat pipe to provide the cross section except the perfect circle, after making the heat pipe from a pipe having perfect circle cross section. Alternatively, the heat pipe may be made from a tube having a cross section except the perfect circle. If a desired configuration of the heat pipe 2' can be obtained as a result, the manufacture method (fabricating method) is not limited thereto.

Step of "Installing the Heat Pipe"

As shown in FIG. 3A, a heat block 3 having a heat pipe-holding hole 3A with a cross section of a regular square is formed. In FIG. 3A, only one heat pipe-holding hole 3A is shown. Herein, an aperture size (vertical and horizontal dimensions of the hole) of the heat pipe-holding hole 3A is preferably determined to be slightly larger (e.g. larger by around 0.5 mm) than a contour size (a length of one side) of the heat pipe 2'. Next, the heat pipe 2' is installed in the heat pipe-holding hole 3A of the heat block 3.

Step of "Heating the Heat Pipe"

Next, as shown in FIG. 3B, the heat pipe 2' is plastically deformed by heating a part or an entire part of the heat pipe 2' at a predetermined temperature for a predetermined time. By heating the heat pipe 2', the hydraulic fluid 2a in the heat pipe 2' is heated, so that the heat pipe 2' is plastically deformed by an expansion force due to a vapor pressure of the hydraulic fluid 2a. As a result, the heat pipe 2 after plastic deformation is contacted closely and joined with the heat block 3.

According to this method, the heat pipe 2 is deformed in the hole of the fin base portion 4A shown in FIG. 2C similarly to FIGS. 3A and 3B. A fin 4 having a fin base portion 4A with a cross section of a regular square is formed. In FIG. 2C, only one fin 4 is shown. Herein, an aperture size (vertical and horizontal dimensions of the hole) of the fin base portions 4A is preferably determined to be slightly larger (e.g. larger by around 0.5 mm) than a contour size (a length of one side) of the heat pipe 2'. Next, the heat pipe 2' is installed in a hole of the fin base portion 4A of the fin 4.

Then, the heat pipe 2' is plastically deformed by heating a part or an entire part of the heat pipe 2' at a predetermined temperature for a predetermined time. By heating the heat pipe 2', the hydraulic fluid 2a in the heat pipe 2' is heated, so that the heat pipe 2' is plastically deformed by an expansion force due to a vapor pressure of the hydraulic fluid 2a. As a result, the heat pipe 2 after plastic deformation is contacted closely and joined with the fin 4.

Next, a heating temperature T for the heat pipe in the first preferred embodiment (the method for fabricating the heat pipe heat exchanger) will be considered below.

In general, a destruct pressure (burst pressure) of a pipe can be expressed by a following equation (i), so-called "hoop stress" equation.

$$Pc = (2 \times \sigma \times t)/D \quad \text{(i)}$$

Pc: Burst pressure (MPa)
σ: Tensile strength of a pipe (N/mm²)
t: Pipe wall thickness (mm)
D: Pipe outer diameter (mm)

In practical, the burst pressure Pc will be smaller than a value obtained from the above equation (i), since the pipe wall thickness t decreases with increasing the pipe outer diameter D just before the burst in accordance with the tube expansion.

For example, in a case where a heat pipe made of copper (outer diameter: 9.52 mm, wall thickness: 0.34 mm) is used, a burst pressure Pc at 300° C. is about 9.5 MPa as derived from the equation (i). Since an internal pressure of about 8.5 MPa is required to generate a plastic deformation of this heat pipe for 0.5 mm in diameter, it is necessary to increase the internal pressure up to around the burst pressure. Therefore, it is concerned that the heat pipe may be broken at the ends having low mechanical strength due to such an increased internal pressure, and it is considered that the yield is deteriorated by this phenomenon.

On the other hand, assuming that a cross section of the heat pipe is of a regular square, deformation of each wall of the pipe can be calculated as "deflection of a beam", and the deflection can be derived from an equation (ii).

$$v = |(W \times L^4)/24 EL| \times |(r/2) - (2r^3/L^3) + (r^4/L^4)| \quad \text{(ii)}$$

$$= 5WL4/384 EI$$

v: Deflection (mm)
W: Stress (N/mm²)
L: Side length (mm)
E: Young's modulus (N/mm²)
r: L/2 (mm)
I: Moment of inertia of area (mm⁴)

Herein, in a case where a heat pipe made of copper (outer diameter d: 9.52 mm, wall thickness t: 0.34 mm) is plastically deformed to provide a pipe having a cross section of a regular square, the deflection of the side wall is derived from the equation (ii). When the heat pipe 2' before plastic deformation having a cross section of a regular square has a periphery length almost equal to a periphery length of the heat pipe having an outer diameter d of 9.52 mm, the side length L of the heat pipe 2' is about 7.5 mm. This corresponds to a case where a pipe having a perfect circle cross section is plastically deformed in a lateral cross section direction and a stretch in a vertical direction (longitudinal direction) is not occurred. It is assumed that the heat pipe 2' is adhered to an inner periphery surface of the heat pipe-holding hole 3A in the heat block 3, and a difference in dimensions between the inner periphery surface of the heat pipe-holding hole 3A and an outer periphery surface of the heat pipe 2' is set to be 0.5 mm, wherein a gap 5 between each side of the cross section of a regular square and the inner periphery surface of the heat pipe-holding hole 3A is 0.25 mm on one side. Similarly, it is assumed that the heat pipe 2' is adhered to an inner periphery surface of the fin base portion 4A in the fin 4, and a difference in dimensions between the inner periphery surface of the fin base portion 4A and an outer periphery surface of the heat pipe 2' is set to be 0.5 mm, wherein a gap 5 between each side of the cross section of a regular square and the inner periphery surface of the fin base portion 4A is 0.25 mm on one side.

Under the aforementioned setting conditions, so as to adhere the outer periphery surface of the heat pipe 2' with the inner periphery surface of the heat pipe-holding hole 3A and that of the fin base portion 4A, respectively, it is sufficient that the heat pipe 2' expands such that respective four sides of the cross section of regular square produce the deflection (stretch) of 0.25 mm or more (at a center of each side, i.e. a position distant from edges for about 3.5 mm). At this time, the stress W caused by the deflection (deflection of 0.25 mm or more) is about 3.5 MPa as derived from the equation (ii).

In addition, it is necessary to increase the side length L for 5% or more as compared with an initial side length, such that the plastic deformation as a permanent set is caused by the deflection (stretch) in the heat pipe 2. In the above case, since the deflection (stretch) of about 7% is caused, this condition is satisfied enough.

As described above, when the heat pipe heat exchanger 1 is fabricated by the tube expansion method, by using the heat pipe 2', which is deformed from a copper heat pipe composed of a cylindrical tube having a perfect circular cross section and an outer diameter of 9.52 mm into a tube having a polygonal cross section (with a profile having a cross section of a regular square in the above example), the heating temperature T can be lowered to a temperature of T≈240 to 245° C. from the heating temperature of T≈300° C. in a conventional case where the heat pipe composed of a cylindrical tube having a perfect circular cross section is used.

Figure 4:
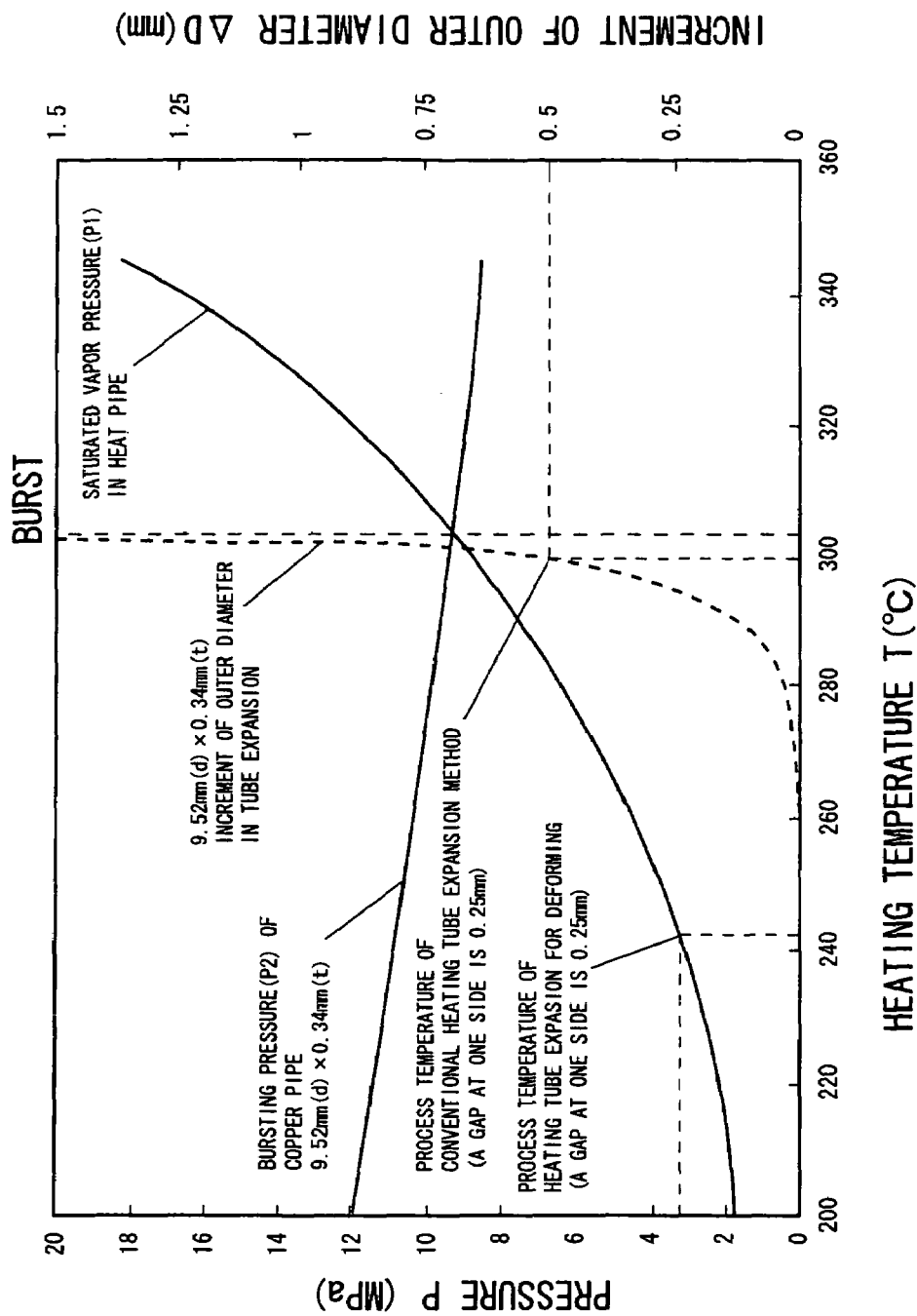
FIG. 4 is a graph for explaining a heating temperature for conducting a method for fabricating a heat pipe heat exchanger in the first preferred embodiment, which shows a relationship between a heating temperature T and a pressure P as well as a relationship between the heating temperature T and an increment $\Delta D$ of an outer diameter of the heat pipe.

FIG. 4 is a graph for explaining a heating temperature for conducting a method for fabricating a heat pipe heat exchanger in the first preferred embodiment, which shows a relationship between the heating temperature T and the burst pressure P as well as a relationship between the heating temperature T and an increment ΔD of the outer diameter of the heat pipe.

As shown in FIG. 4, when the heating temperature T is about 240 to 245° C. (T≈240 to 245° C.), a saturated vapor pressure P1 in the heat pipe is about 3.5 MPa.

(Effect of the First Preferred Embodiment)

According to the first preferred embodiment, following effects can be obtained.

(1) In a case where the heat pipe 2' having a cross section of a regular square disposed in the heat pipe-holding hole 3A and the fin base portion 4A each having a cross section of a regular square is heated, so that the heat pipe 2' is plastically deformed by the expansion force due to the vapor pressure of the hydraulic fluid in the heat pipe 2' to attach the heat pipe 2' to the heat block 3 and the fin 4, respectively, the heat pipe heat exchanger 1 can be obtained by heating the heat pipe 2' at a temperature (e.g. about 240° C.) that is lower enough than a critical temperature (bursting temperature) of the conventional heat pipe having a perfect circle cross section, and so that the charge in thermal management can be reduced.

(2) For obtaining the heat pipe heat exchanger 1, it is sufficient to heat the heat pipe 2' around a temperature lower enough than the bursting temperature of the conventional heat pipe having the perfect circle cross section, so that both the thermal load and the pressure load on the heat pipe 2' can be reduced. According to this, the rate of defective products can be reduced and the productivity can be increased, so that the heat pipe heat exchanger with low fabrication cost can be provided.

Second Preferred Embodiment

Figure 5A:
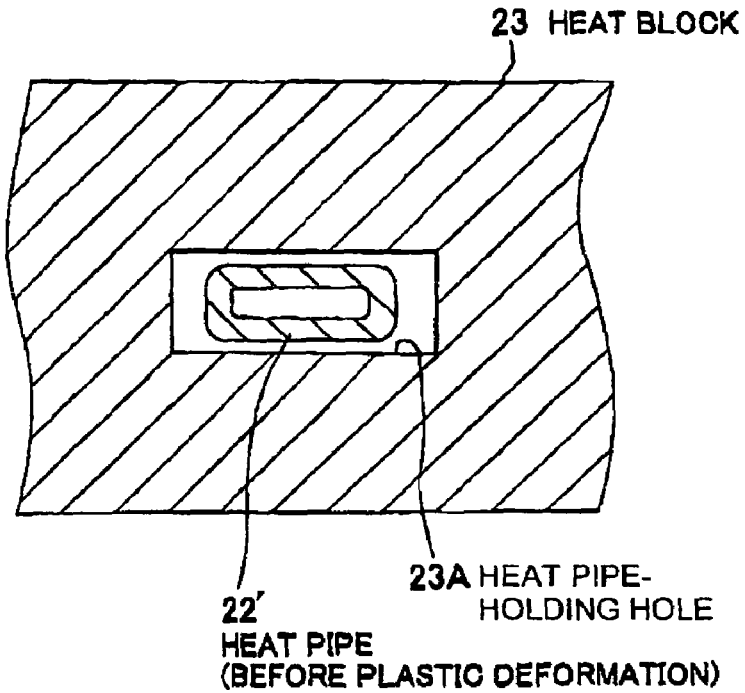
Figure 5B:
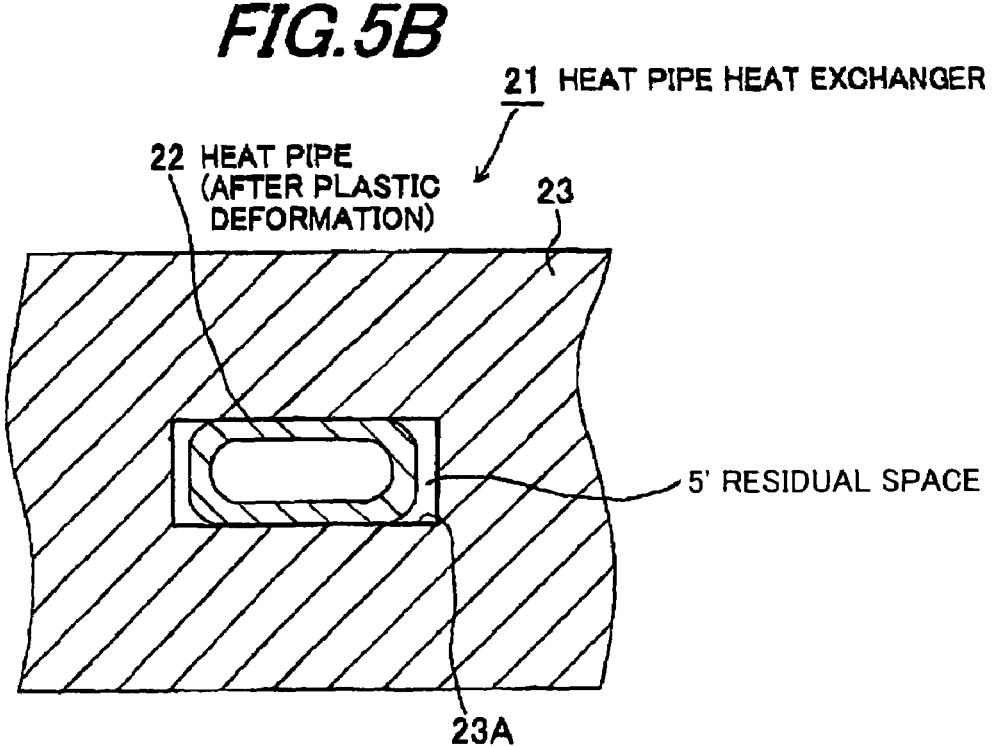

FIGS. 5A and 5B are cross sectional views of a heat pipe heat exchanger showing a method for fabricating a heat pipe heat exchanger in the second preferred embodiment according to the invention, wherein FIG. 5A is a cross sectional view showing a heat pipe before plastic deformation installed in a heat pipe-holding hole and FIG. 5B is a cross sectional view showing a heat pipe after plastic deformation. Herein, the cross sectional views shown in FIGS. 5A and 5B in the second preferred embodiment are similar to the cross sectional view shown in FIG. 2B in the first preferred embodiment.

As shown in FIG. 5B, in a heat pipe heat exchanger 21 in the second preferred embodiment, a cross section of a heat pipe 22 and a cross section of a heat pipe-holding hole 23A of a heat block 23 are different from those of the heat pipe heat exchanger 1 in the first preferred embodiment. In FIGS. 5A and 5B, the number of the heat pipe-holding hole 23A is one.

The heat pipe 22' (before plastic deformation) is composed of a closed container comprising a pipe having a rectangular cross section. Herein, the rectangular shape is obtained by conducting a flatness work on a pipe having a perfect circle cross section, so that the rectangular cross section has a curvature (R) at each corner or short side.

The heat pipe-holding hole 23A of the heat block 23 is provided with an opening configuration having a rectangular cross section. As shown in FIG. 5A, as for an aperture size of the heat pipe-holding hole 23A, a short side length of the cross section of the heat pipe-holding hole 23A is determined to be slightly longer (e.g. longer by around 0.5 mm) than a short side length of the cross section of the heat pipe 22', and a long side length of the cross section of the heat pipe-holding hole 23A is determined to be longer enough (e.g. by about 1.5 times) than a long side length of the cross section of the heat pipe 22'.

In the second preferred embodiment, a case where the cross section of the heat pipe 22' is not analogous to the cross section of the heat pipe-holding hole 23A is described. However, the present invention is not limited thereto. Similarly to the first preferred embodiment, the cross section of the heat pipe 22' may be analogous to that of the heat pipe-holding hole 23A. In any preferred embodiments, it is desirable that the cross section of the heat pipe-holding hole 23A and that of the heat pipe 22' are similar to each other regardless they are analogous. However, the present invention is not limited thereto, and the cross section of the heat pipe-holding hole 23A and that of the heat pipe 22' may have different shapes. For example, while the heat pipe 22' has a cross section of a regular square, the heat pipe-holding hole 23A may have a hexagonal cross section.

The heat pipe heat exchanger 21 may be manufactured similarly to the heat pipe heat exchanger 1 in the first preferred embodiment.

In concrete, the heat pipe-holding hole 23A of the heat block 23 is first formed such that the heat pipe-holding hole 23A has an inner periphery size larger than outer periphery size of the heat pipe 22' as shown in FIG. 5A. Next, the heat pipe 22' is disposed in the heat pipe-holding hole 23A. Thereafter, the heat pipe 22' is plastically deformed by the expansion force by heating, so that the heat pipe 22 (after plastic deformation) is contacted closely to and joined with the heat block 23 as shown in FIG. 5B. A residual space 5' is provided between an outer periphery surface of the heat pipe 22 and an inner periphery surface of the heat pipe-holding hole 23A.

Figure 6A:
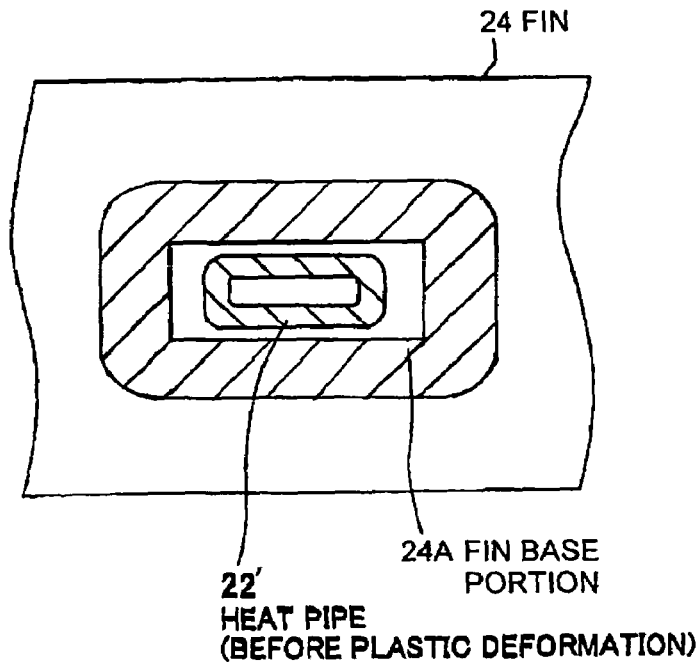
Figure 6B:
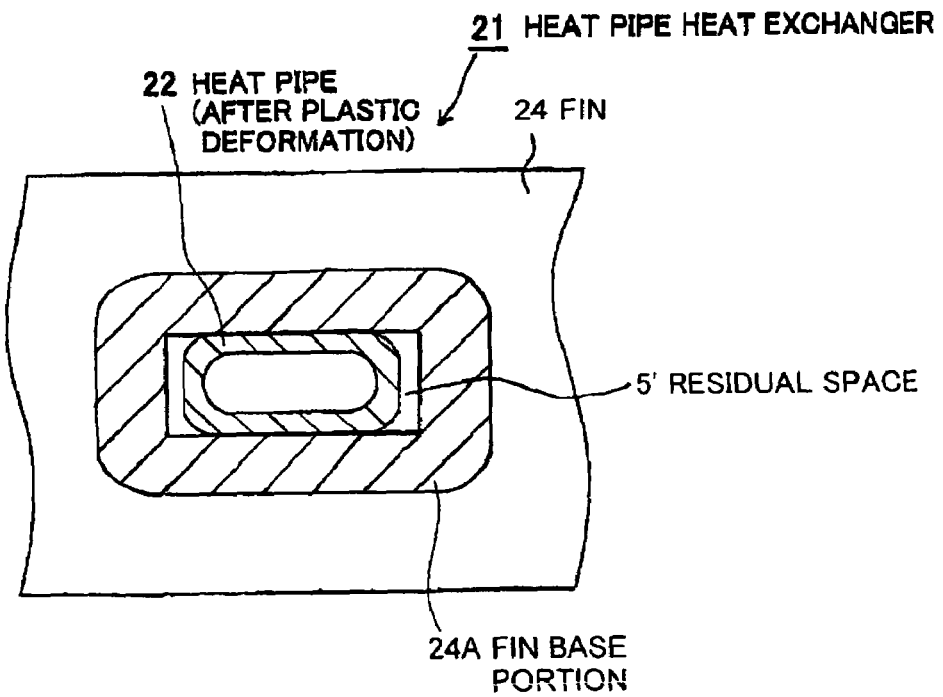

FIGS. 6A and 6B are cross sectional views of the heat pipe heat exchanger showing a method for fabricating a heat pipe heat exchanger in the second preferred embodiment according to the invention, wherein FIG. 6A is a cross sectional view showing a heat pipe before plastic deformation installed in a fin base portion and FIG. 6B is a cross sectional view showing a heat pipe after plastic deformation. Herein, the cross sectional views shown in FIGS. 6A and 6B in the second preferred embodiment are similar to the cross sectional view shown in FIG. 2C in the first preferred embodiment.

As shown in FIG. 6B, in the heat pipe heat exchanger 21 in the second preferred embodiment, both a cross section of the heat pipe 22 and a cross section of a fin base portion 24A of a fin 24 are different from those of the heat pipe heat exchanger 1 in the first preferred embodiment. The number of the fin base portions 24A is one.

The fin base portion 24A of the fin 24 is provided with an opening configuration having a rectangular cross section. As for an aperture size of the fin base portion 24A, a short side length of the cross section of the fin base portion 24A is determined to be slightly longer (e.g. longer by around 0.5 mm) than a short side length of the cross section of the heat pipe 22', and a long side length of the cross section of the fin base portion 24A is determined to be longer enough (e.g. by about 1.5 times) than a long side length of the cross section of the heat pipe 22'.

In the second preferred embodiment, a case where the cross section of the heat pipe 22' is not analogous to the cross section of the fin base portion 24A is described. However, the present invention is not limited thereto. Similarly to the first preferred embodiment, the cross section of the heat pipe 22' may be analogous to the cross section of the fin base portion 24A. In any preferred embodiments, it is desirable that the cross section of the fin base portion 24A and that of the heat pipe 22' are similar to each other regardless they are analogous. However, the present invention is not limited thereto, and the cross section of the fin base portion 24A and that of the heat pipe 22' may have different shapes. For example, while the heat pipe 22' has a cross section of a regular square, the fin base portion 24A may have a hexagonal cross section.

In concrete, the fin base portion 24A of the fin 24 is first formed such that the fin base portion 24A has an inner periphery size larger than outer periphery size of the heat pipe 22'. Next, the heat pipe 22' is disposed in the fin base portion 24A. Thereafter, the heat pipe 22' is plastically deformed by the expansion force by heating, so that the heat pipe 22 (after plastic deformation) is contacted closely to and joined with the fin base portion 24A. A residual space 5' is provided between an outer periphery surface of the heat pipe 22 and an inner periphery surface of the fin base portions 24A.

(Effect of the Second Preferred Embodiment)

According to the second preferred embodiment, effects similar to those of the first preferred embodiment can be obtained.

As described above, a heat pipe heat exchanger of the present invention is explained according to the first and second preferred embodiments as things mentioned above, however, the present invention is not limited thereto. The present invention can be realized in various embodiments within a scope, which does not go beyond the subject matter of the present invention. For example, following variations are also possible.

(1) In the first preferred embodiment, a case where the cross section of the heat pipe 2 and the cross section of each of the heat pipe-holding hole 3A and the fin base portions 4A are of regular square is explained. In the second preferred embodiment, a case where the cross section of the heat pipe 22' before plastic deformation and the cross section of each of the heat pipe-holding hole 23A and the fin base portions 24A are rectangular is explained. However, the present invention is not limited thereto, and the cross section (profile) of the heat pipe and the cross section of each of the heat pipe-holding hole and the fin base portion may be other polygons, oval-shape or race-track configuration. In brief, the present invention can be realized if the heat pipe is composed of a pipe having a cross section except the perfect circle, and each of the heat pipe-holding hole and the fin base portion may be provided with a hole having a cross section except the perfect circle.

(2) A residual space 5' formed (at corners of the pipe-holding hole) between an outer periphery surface of the heat pipe 2, 22 after plastic deformation and inner periphery surfaces of each of the heat pipe-holding holes 3A, 23A and the fin base portions 4A, 24A may be preferably filled with solder, heat transfer adhesive or heat transfer grease. In addition, an interposing member such as solder plating materials, tin plating materials and/or soft metal (metal softer than the heat block and the heat pipe) may be interposed between the outer periphery surface of the heat pipe 2, 22 after plastic deformation and the inner periphery surfaces of the heat pipe-holding holes 3A, 23A and the fin base portions 4A, 24A, respectively. According to this structure, it is possible to reduce a resistance of the contact heat transfer between the heat pipe 2, 22 and the heat block 3, 23 and between the heat pipe 2, 22 and the fin 4, 24.

(3) In the first and second preferred embodiments, the heat pipe-holding hole 3A, 23A and the fin base portion 4A, 24A are provided. However, the present invention is not limited thereto. Each of the heat pipe-holding hole and the fin base portion may not have a hole configuration, and may have a slit shape (concave groove shape). According to this structure, there is an advantage in that the heat pipe 2, 22 may be installed easily.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A method for fabricating a heat pipe heat exchanger, comprising the steps of:
    providing a heat pipe containing a predetermined amount of hydraulic fluid;
    providing a heat conductive member having a heat pipe-holding hole with a cross section other than a perfect circle prior to a heat treatment;
    installing the heat pipe in the heat pipe-holding hole to provide a gap between the heat pipe and the heat conductive member prior to a heating treatment such that at least one part of the heat pipe is surrounded at all sides by said heat conductive member; and
    embedding the heat pipe in the heat pipe-holding hole, the embedding of the heat pipe comprising plastically deforming the heat pipe in the heat pipe-holding hole by heating tube expansion such that the heat pipe is fixed to the heat conductive member, the plastically deforming of the heat pipe comprising heating the heat pipe at a predetermined temperature such that an outer periphery surface of the heat pipe is in contact with an inner periphery surface of the heat conductive member while keeping spaces between the outer periphery surface of the heat pipe and the inner periphery surface of the heat conductive member, after expansion of the heat pipe, positioning the heat conducting member to receive heat from a heat exchange object.

2. The method for fabricating the heat pipe heat exchanger according to claim 1, wherein the heat pipe comprises a pipe having a polygonal cross section, and
    wherein the cross section of the heat pipe-holding hole has a polygonal shape.

3. The method for fabricating the heat pipe heat exchanger according to claim 1, wherein a cross section of the heat pipe and the cross section of the heat pipe-holding hole are analogous to each other.

4. The method for fabricating the heat pipe heat exchanger according to claim 1, wherein the heat pipe comprises a cross section of a regular square,
    wherein the cross section of the heat pipe-holding hole has a regular square shape, and
    wherein the heat pipe is plastically deformed to contact with the heat conductive member along four sides.

5. The method for fabricating the heat pipe heat exchanger according to claim 4, wherein the heat pipe is plastically deformed to contact the heat conductive member with keeping four spaces at four corners of the regular square shape of the cross section of the heat pipe-holding hole.

6. The method for fabricating the heat pipe heat exchanger according to claim 1, wherein the heat pipe comprises a cross section of a rectangle,
wherein the cross section of the heat pipe-holding hole has a rectangular shape, and
wherein the heat pipe is plastically deformed to contact with the heat conductive member along two sides.

7. The method for fabricating the heat pipe heat exchanger according to claim 6, wherein the heat pipe is plastically deformed to contact the heat conductive member with keeping two spaces at both sides of the rectangular shape of the cross section of the heat pipe-holding hole.

8. A method for fabricating a heat pipe heat exchanger, comprising:
providing a heat pipe containing a predetermined amount of hydraulic fluid;
providing a heat conductive member having a heat pipe-holding hole with a cross section other than a perfect circle prior to a heat treatment;
installing the heat pipe in the heat pipe-holding hole to provide a gap between the heat pipe and the heat conductive member prior to a heating treatment such that at least one part of the heat pipe is surrounded at all sides by said heat conductive member; and
embedding the heat pipe in the heat pipe-holding hole, the embedding of the heat pipe comprising plastically deforming the heat pipe in the heat pipe-holding hole by heating tube expansion such that the heat nine is fixed to the heat conductive member, the plastically deforming of the heat nine comprising heating the heat pipe at a predetermined temperature such that an outer periphery surface of the heat pipe is in contact with an inner periphery surface of the heat conductive member while keeping spaces between the outer periphery surface of the heat pipe and the inner periphery surface of the heat conductive member, after expansion of the heat pipe, positioning the heat conducting member to receive heat from a heat exchange object.

9. The method for fabricating the heat pipe heat exchanger according to claim 8, wherein the heat pipe comprises one of a polygonal and an oval cross section, and
wherein the cross section of the heat pipe-holding hole has one of a polygonal and an oval shape.

10. The method for fabricating the heat pipe heat exchanger according to claim 8, wherein a cross section of the heat pipe comprises a regular square, and
wherein the cross section of the heat pipe-holding hole has a hexagonal shape.

11. The method for fabricating the heat pipe heat exchanger according to claim 8, wherein the heat pipe comprises a cross section of a regular square,
wherein the cross section of the heat pipe-holding hole has a regular square shape, and
wherein the heat pipe is plastically deformed to contact with the heat conductive member along four sides.

12. The method for fabricating the heat pipe heat exchanger according to claim 11, wherein the heat pipe is plastically deformed to contact the heat conductive member with keeping four spaces at four corners of the regular square shape of the cross section of the heat pipe-holding hole.

13. The method for fabricating the heat pipe heat exchanger according to claim 11, wherein the heat pipe-holding hole has a concave groove shape.

14. The method for fabricating the heat pipe heat exchanger according to claim 8, wherein the heat pipe comprises a rectangular cross section,
wherein the cross section of the heat pipe-holding hole has a rectangular shape, and
wherein the heat pipe is plastically deformed to contact with the heat conductive member along two sides.

15. The method for fabricating the heat pipe heat exchanger according to claim 14, wherein the heat pipe is plastically deformed to contact the heat conductive member with keeping two spaces at both sides of the rectangular shape of the cross section of the heat pipe-holding hole.

16. The method for fabricating the heat pipe heat exchanger according to claim 14, wherein said rectangular cross section of said heat pipe includes a curvature at each corner.

17. The method for fabricating the heat pipe heat exchanger according to claim 8, wherein said heating the heat pipe increases a side length of the heat pipe by 5% or more compared with an initial length of the side length of the heat pipe.

18. The method for fabricating the heat pipe heat exchanger according to claim 8, wherein the heat pipe comprises one of copper and a copper alloy, and
wherein the predetermined temperature comprises a temperature in a range of 240° C. to 245° C.

19. The method for fabricating the heat pipe heat exchanger according to claim 8, wherein said hydraulic fluid comprises one of water, a chlorofluorocarbon, and ammonia water.

20. The method for fabricating the heat pipe heat exchanger according to claim 8, wherein the heat pipe comprises one of titanium, a titanium ahoy, and stainless steel.

21. The method for fabricating the heat pipe heat exchanger according to claim 8, wherein a pipe axis direction side of the heat pipe is not surrounded by said heat conductive member.

* * * * *